United States Patent [19]

Foulke et al.

[11] 3,863,827

[45] Feb. 4, 1975

[54] TAILLESS WIRE BONDER

[75] Inventors: Richard F. Foulke, Carlisle; James E. Kelly, Melrose, both of Mass.

[73] Assignee: Mech-El Industries, Inc., Woburn, Mass.

[22] Filed: Nov. 10, 1972

[21] Appl. No.: 305,568

[52] U.S. Cl. .......... 228/5, 228/1, 228/13, 228/15

[51] Int. Cl. .......... B23k 37/04

[58] Field of Search .......... 228/1, 4, 13, 5, 15

[56] References Cited

UNITED STATES PATENTS

| | | | |
|---|---|---|---|
| 3,250,452 | 5/1966 | Angelucci et al. | 228/3 |
| 3,430,835 | 3/1969 | Grable et al. | 228/4 |
| 3,543,988 | 12/1970 | Kulicke, Jr. | 228/1 X |
| 3,626,590 | 12/1971 | Miller | 228/1 X |
| 3,643,321 | 2/1972 | Field et al. | 228/4 X |
| 3,659,770 | 5/1972 | Miller | 228/1 |
| 3,734,386 | 5/1973 | Hazel | 228/1 X |

*Primary Examiner*—Richard B. Lazarus
*Attorney, Agent, or Firm*—James J. Cannon, Jr.

[57] ABSTRACT

An improved tailless wire-bonding apparatus for bonding fine wire such as that used in the manufacture of semiconductor devices. An improved wire control and feed system permits this apparatus to bond at varying work heights, expose a predetermined length of wire below the bonding tool after each termination bond and to form a ball or wedge of uniform size for commencement of the next bonding sequence. A wire threaded through a capillary bonding tool is maintained taut as the wire is being bonded for a termination bond. After the termination bond is made, a clamp closes on the wire and moves downward to form a bow in the wire between the clamp and the top of the bonding tool. With the clamp still closed, the arm assembly to which the bonding tool and clamp are attached rises upward, straightening the wire and breaking the wire at the termination bond, leaving a small piece of wire exposed through the tip of the bonding tool. The length of this wire is a function of the size of the bow and can be accurately predetermined by a simple adjustment to the length of the arc of the clamp. After flame-off or wipe-off, the clamp opens and returns to its starting position, the wire feed system pulling the ball or wedge back to the tip of the bonding tool. The system is then ready for the start of the next bonding cycle.

4 Claims, 12 Drawing Figures

TAILLESS WIRE BONDER

BACKGROUND OF THE INVENTION

1. FIELD OF THE INVENTION

This invention pertains to an apparatus for bonding fine metallic wires to electrical leads or other metallic surfaces either by means of ultrasonic energy or by means of thermocompression techniques. Specifically, it relates to an improvement in the means for restarting the bonding cycle after a plurality of bonds have been made in the process of manufacturing an electrical circuit. It should be understood, however, that the invention is primarily concerned with the bonding of fine metallic surfaces and applications of this technique may be found in the manufacture of items other than electrical circuits.

2. DESCRIPTION OF THE PRIOR ART

In the process of manufacturing semiconductor devices and other microminiature electrical components and circuits, a series of steps called wire bonding is performed to connect various terminals with a very fine conductive wire. Numerous patents, including U.S. Pat. No. 3,400,448, U.S. Pat. No. 3,250,452, U.S. Pat. No. 3,543,988, U.S. Pat. No. 3,626,590, U.S. Pat. No. 3,641,660, U.S. Pat. No. 3,643,321 and U.S. Pat. No. 3,648,354, describe various devices, methods and techniques for fine wire bonding.

Important sub-classes of wire bonders are known in the trade as ball bonders and wedge bonders. U.S. Pat. No. 3,643,321, U.S. Pat. No. 3,641,660, and U.S. Pat. No. 3,400,448 describe the ball bonding devices and methods. Another important aspect of this bonding technique is the elimination of any excess wire or tail after a final or termination bond is made in a series of bonding operations. The technique of tailless wire bonding is fully described in the prior art cited supra.

The present invention is directed to an improvement in one aspect of the bonding process. In most wire bonding devices a fine wire, as small as one-half mil in diameter, is threaded through a capillary bonding tool and held in position by that tool for bonding. In order to make a first bond with sufficient material to make an effective contact, a predetermined length of wire is exposed beneath the needle-shaped tip of the bonding tool. In a ball bonder, a flame is passed under this wire, melting its tip to form a small ball having a diameter of approximately double that of the diameter of the wire. If it is desirous to have a wedge bond for the first bond, a wiper sweeps past the tip of the bonding tool to bend this length of wire into a hook. The wire is then retracted by the wire feed system until the ball or hook is near the bonding tip and the bonder is now ready to make its first bond. The first bonding or contact is moved under the tip of the bonding tool, the bonding tool is lowered to press the ball or hook-shaped wedge against the contact simultaneously with the application of ultrasonic or thermocompression energy, thus effecting a bond. The bonding tool is then raised and the tool or work piece is moved to the next electrical contact or bonding point. Wire is positively played out during this move and held against the side of the bonding tool. As the bonding tool is lowered to effect the next bond, the length of wire held against its tip is sufficient to make an effective stitch bond. After a series of one or more bonds, which may be initial or stitch bonds, the last of which is called a termination bond, the wire is clamped and pulled away. Methods and devices for a clean break at this point are well known in the prior art and described in the above-cited patents pertaining to tailless wire bonding. After a break, a length of wire remains exposed below the bonding tip. Depending on the type of initial bond desired, a flame is passed under this wire to form a new ball, or a wiper forms a new hook, in preparation for the next bonding cycle.

In the manufacture of electrical circuits and devices, it is critical that the size of the bonding points remain constant. The size of the ball or hook-shaped wedge formed after flame-off or wipe-off is a function of the length of wire left exposed under the bonding tip after the tailless break and the position of the flame or wiper relative to this length of wire. A means of automatic control of these two factors by keeping them constant despite varying heights of the work surface of the termination bond is the point of novelty of this invention.

To achieve a uniform ball or wedge whose size can be adjusted by a simple operator control and whose size is independent of the height of the work surface, it is necessary to control the wire feed so that a predetermined length of wire is exposed below the tip of the bonding tool and a flame or wiper passes by the end of this wire at a predetermined distance below the tip, each of these distances being independent of the height of the bond above the operator's working surface.

Only one of the above-cited U.S. Pats., i.e., No. 3,643,321, addresses itself to this problem. This specification of this patent states that, following a termination bond, after the bonding nib has been raised a predetermined distance indicative of the desired length of wire to be exposed out of the end of the bonding nib, that flame-off occurs and a uniform ball is formed. However, a close study of the mechanism disclosed therein shows no means to compensate for the varying heights of bonding points on the work surface. In effect, it appears to be impossible to obtain a uniform predetermined length of wire below the bonding nib following each termination bond with the mechanism disclosed and such a result is not claimed.

The present invention provides a solution to this problem as well as a far simpler and less expensive tailless wire bonder.

SUMMARY OF THE INVENTION

The present invention provides an improved and simplified wire and feed control mechanism for a tailless wire-bonding apparatus for bonding fine wire to a metallic or other surface, breaking the wire after a termination bond beyond the bond and exposing a predetermined length of wire for formation of a ball or hook of uniform size to commence the next cycle of bonding.

The predetermined length of wire and the uniform size of ball or hook are achieved independently of the possible varying heights of the termination points above the work surface. A wire threaded through a capillary bonding tool is maintained taut as it is being bonded for a termination bond. After a bond is made, a clamp mechanically linked to the bonding tool holder closes on the wire and pivots downward slightly to form a bow in the wire between the clamp and the top of the bonding tool. With the clamp still closed, the arm assembly, to which both the clamp and the bonding tool are attached, rises upward, straightening the wire and breaking it just after the bond, leaving a small length of wire exposed through the tip of the bonding tool. The length of this wire is a function of the size of the bow and can be accurately predetermined by a simple adjustment to the length of the arc of the clamp. After flame-off or wipe-off, a ball or wedge of uniform size is formed, the clamp is opened and the wire feed system pulls the ball or wedge back to the tip while the clamp returns to its starting position for commencement of the next bonding cycle.

DESCRIPTION OF THE PREFERRED EMBODIMENT

Figures 8, 9, 10:
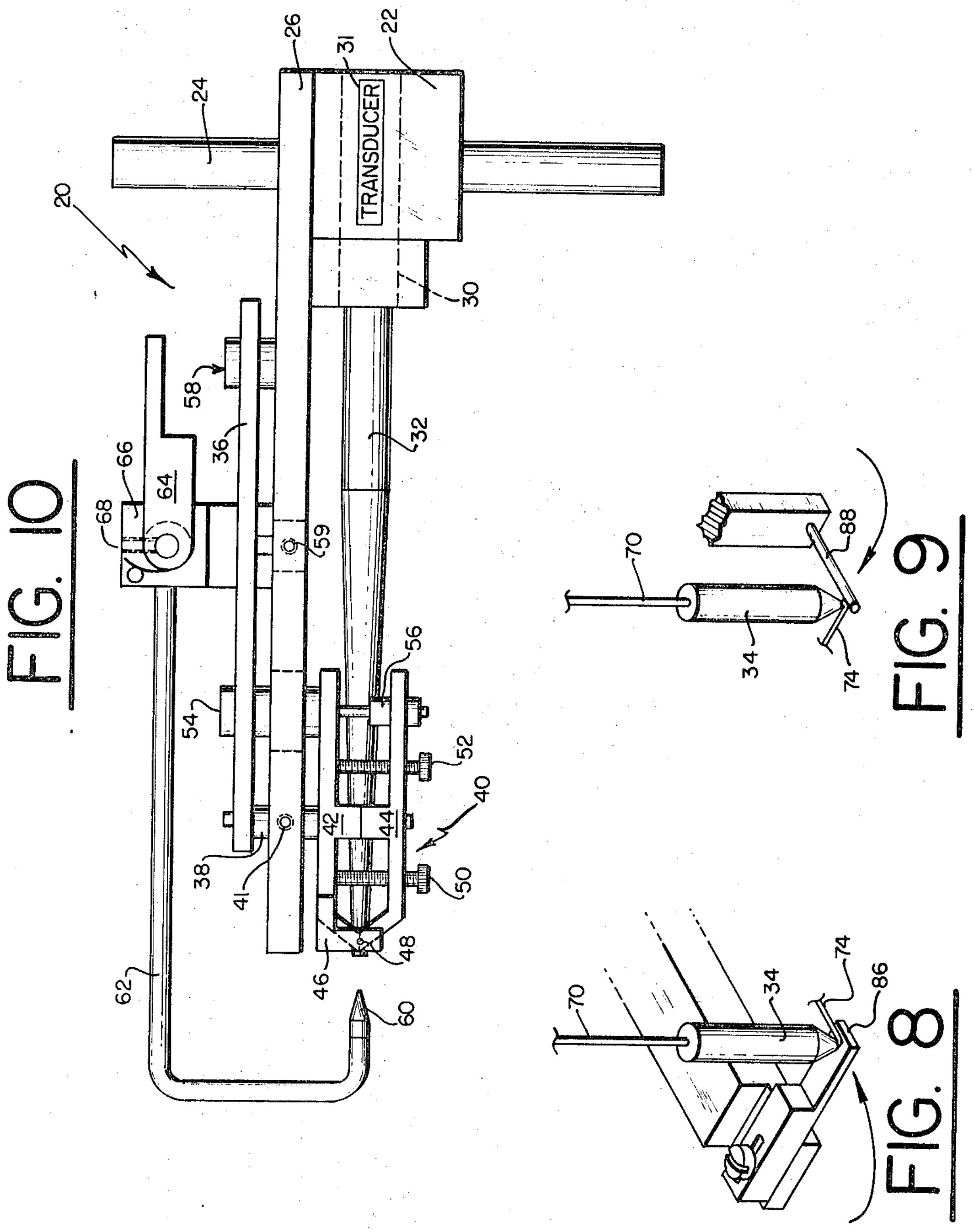
FIG. 8 is a side perspective view of a front to back wiper system, replacing the flame-off system.
FIG. 9 is a side perspective view of a left to right wiper system, replacing the flame-off system.
FIG. 10 is a top view of the assembly arm showing the mechanical linkages of this system.
Figure 11:
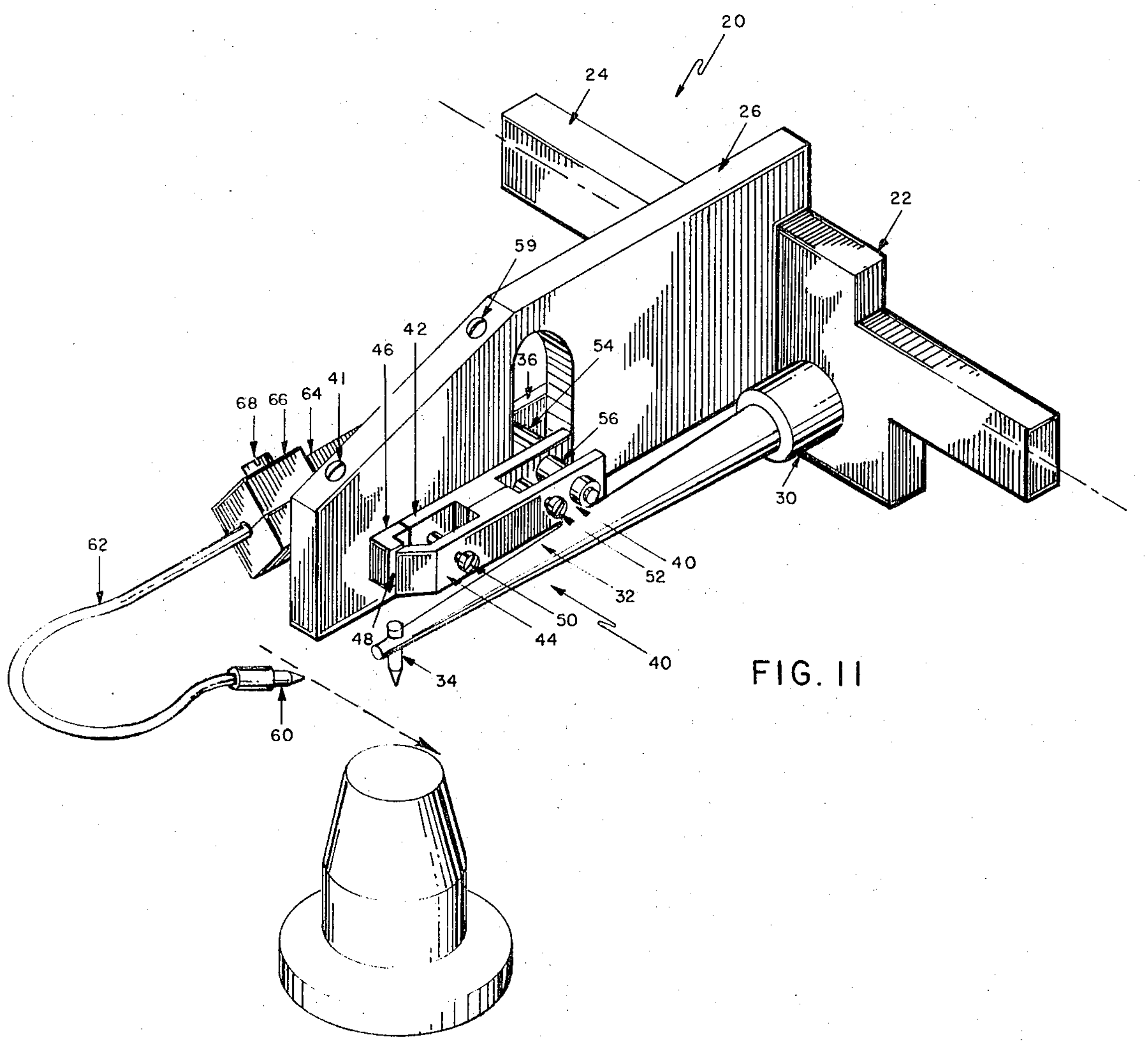
FIG. 11 is a perspective view of FIG. 10.
Figure 12:
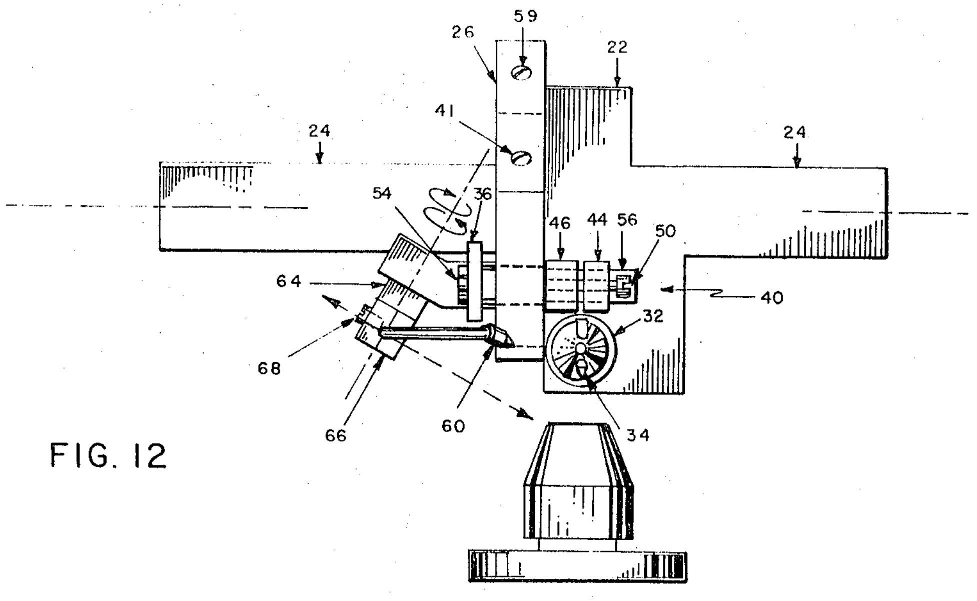
FIG. 12 is a front view of FIG. 10.

Referring now to the drawings, FIGS. 1 through 6 inclusive illustrate the principles of operation of the present invention in successive phases of the bonding cycle. FIG. 10 illustrates the assembly arm mechanism denoted generally by the reference number 20.

Assembly arm mechanism 20 comprises a pivot block 22 with a cylindrical cavity 30 pivotally attached to a horizontal support arm 24, an assembly arm 26, one end of which is rigidly attached to one side of pivot block 22, and a tool holder 32, one end of which is rigidly attached to the front of pivot block 22. Assembly arm 26, which serves as a mounting means for some of the other parts hereinafter described, is a trapezoidally shaped plate having a narrow rearward extension, the end of which is rigidly attached to one side of pivot block 22. Assembly arm 26 extends horizontally forward from pivot block 22 and its longitudinal axis is substantially perpendicular to support arm 24. Tool holder 32 also extends horizontally forward from pivot block 22 parallel to and slightly lower than assembly arm 26, such that its longitudinal axis is perpendicular to pivot block 22. In a configuration designed for ultrasonic bonding, tool holder 32 serves as a transducer 31 horn; a transducer is mounted within cavity 30, and a capillary bonding tool 34 (FIG. 1) is perpendicularly mounted at the forward end of transducer horn 32. In a configuration designed for thermocompression bonding (not shown) the tool holder 32 would serve as a support arm. The forward end holding the bonding tool 34 would comprise a heater and a heater block separated from the rear portion of the support arm by an insulator. A lever arm 36 is pivotally mounted to assembly arm 26 such that its longitudinal axis is parallel to that of assembly arm 26 on the side opposite tool holder 32.

Pivotally mounted through assembly arm 26 and rigidly mounted at one end to lever arm 36 is a bearing housing 38. Wire clamp 40 is rigidly mounted to the other end of bearing housing 38, at a position directly over tool holder 32. A set screw 41 permits the bearing housing to move sidewise in assembly arm 26 in order to align the center line of clamp 40 with the center line of tool holder 32. Clamp 40 comprises two pivoting F-shaped arms 42, 44 whose jaws meet at a point directly above the capillary of bonding tool 34 for clamping wire as it feeds into capillary bonding tip 34. The jaws of clamp 40 are lined with rubber pads (not shown). The longitudinal axis of clamp 40 is directly above and parallel to that of tool holder 32. Mounted on top of clamp arm 42 is an L-shaped wire guide plate 46 having a small hole 48 directly above the jaws of the clamp. This hold 48 serves as a guide to keep the wire centered in the jaws 42, 44 of clamp 40 and feeding through jaws 42, 44 cleanly down to the capillary of bonding tip 34. The balance of the wire feed system comprises a wire guide (not shown) mounted near the top of assembly 26 and a wire feed spool (not shown) mounted on the rear of assembly arm 26. Wire is fed from the spool over the wire guide, through hole 48 in wire guide plate 46, through the jaws of clamp 40 and through the capillary of bonding tip 34. An adjustment screw 50 is provided between the jaws and the middle bars of clamp 40 to limit the amount of jaw closure. A second adjustment screw 52 is provided between the center bars and the other end of clamp 40 to limit the amount of jaw opening. An actuator 54, mechanical, pneumatic or electrical, such as a solenoid, is mounted on clamp arm 42 and when activated closes clamp 40. An adjustable collar 56 is mounted between the open ends of clamp arms 42, 44 to maintain clamp 40 in a normally open position. An actuator 58 is mounted toward the rear of assembly arm 26 when activated transmits a linear motion to lever arm 36 causing the rear end of lever arm 36 to rise and to transmit a rotary motion to clamp 40 through heating bearing housing 38. An adjustable set screw 59 controls the length of the arc of the pivoting motion of lever arm 36 and has the effect of controlling the length of wire in the bow 73 described infra.

A flame-off system comprising a flame-off tip 60, a hydrogen tube 62, a pivot arm 64 and a pivot block 66 are mounted on assembly arm 26. This system permits the flame-off tip 60 to swing under bonding tool 34 when required. An adjustable set screw 68 controls the height of the flame-off tip 60 relative to the bottom tip of the bonding tool 34 so that a constant distance can be maintained.

Two additional adjustable set screws (not shown) are located in pivot block 22 for alignment of tool holder 32 with clamp 40 and rotating the tool holder 32 and transducer, if present, so that bonding tool 34 is perpendicular to the work station.

The balance of this tailless wire bonder is conventional in design and operation. In the remainder of this specification, the description of the preferred embodiment will be limited to the configuration utilizing ultrasonic energy.

Figure 7:
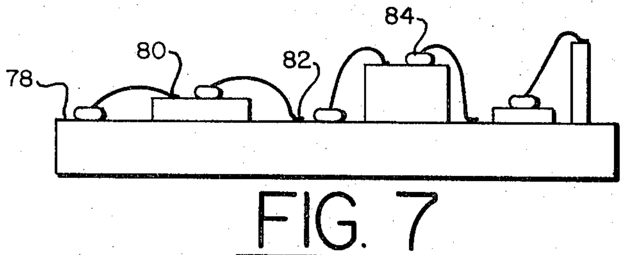
FIG. 7 is a diagrammatic representation of a substrate illustrating ball bonds and termination bonds at varying heights from the work surface.

FIG. 7, using ball bonds for initial bonds, illustrates in exaggerated form the problem to which this invention is addressed. In bonding fine wires to various surfaces, the points of bond 78, 80, 82 and 84 usually are of varying heights above the work surface 78. In microelectronic applications this occurs frequently in bonding electrical leads from a circuit chip to a substrate. Even the surface of a chip may have significant variations from point to point. The operation of the present wire control system about to be described provides a simple mechanical compensation for these variations to insure uniformity in the length of wire exposed after each termination bond and the subsequent ball or wedge-shaped hook formed from this length of wire.

Figure 1:
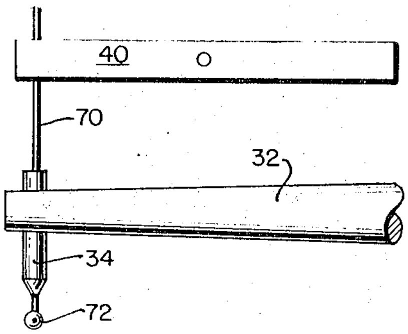
FIG. 1 is a side view of the bonding tool toolholder and clamp of this invention prior to an initial bond with the clamp open.
Figure 2:
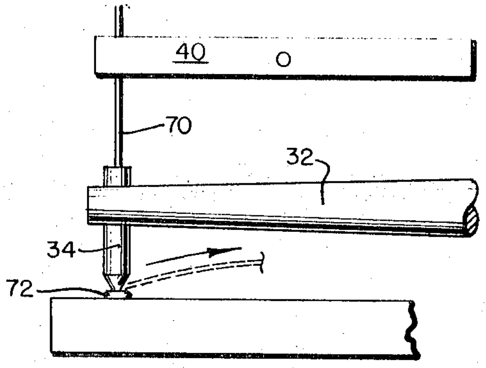
FIG. 2 is a side view of the mechanism of FIG. 1 as the initial bond is being made. The next movement of the bonding tool relative to the work surfaces is illustrated in dotted lines, the clamp still being open.
Figure 3:
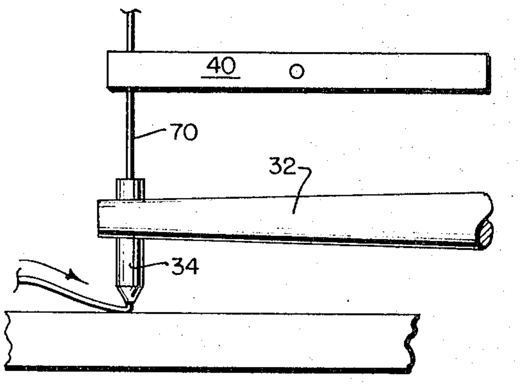
FIG. 3 is a side view of the mechanism of FIG. 1 as a termination bond is being made.
Figure 4:
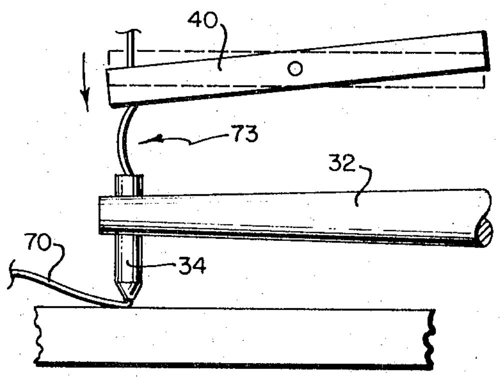
FIG. 4 is a side view of the mechanism of FIG. 1 after a termination bond has been made, showing the clamp closed and pivoted downward to cause a bow in the wire.
Figure 5:
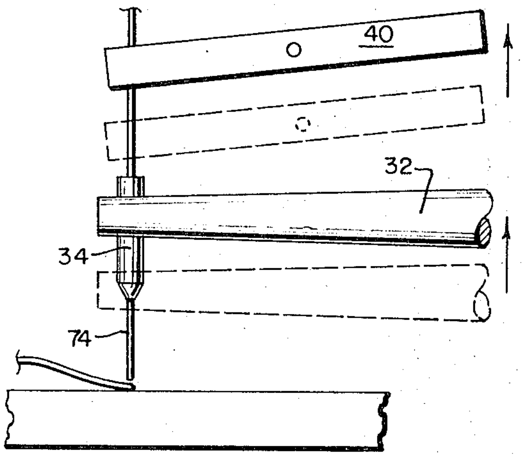
FIG. 5 is a side view of the mechanism of FIG. 1 showing the arm assembly including clamp and bonding tool rising, straightening the bow, breaking the wire at the bond and exposing a predetermined length of wire below the bonding tip.
Figure 6:
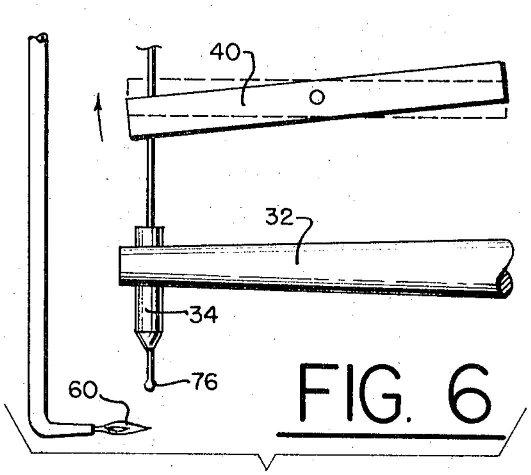
FIG. 6 is a side view of the mechanism of FIG. 1 showing the flame-off with the clamp closed, and the subsequent release and rise of the clamp as the mechanism returns to the starting position of FIG. 1.

Referring now to FIGS. 1 to 6, FIG. 1 illustrates the bonding tool 34 mounted in transducer horn 32, the clamp 40, and a length of wire 70 fed through the clamp and the capillary of bonding tool 34 with a small ball 72 formed at the end thereof. FIG. 1 illustrates the starting position of these components as a sequence of bonding operation is about to begin. At this point, clamp 40 is open. FIG. 2 illustrates the relative position of these components as the first bond is made. Clamp 40, transducer horn 32, and bonding tool 34 are lowered into position and ultrasonic energy is applied from transducer 30 through transducer horn 32 to bonding tool 34. Wire 70 feeds from a wire spool (not shown). FIG. 2 illustrates in dotted lines the subsequent relative movement of the bonding tool 34 and wire 70 as they move into relative position for the next bond. This movement is a movement of the work piece under the bonding tip 34. Subsequent bonds may be either stitch bonds or a termination bond. FIG. 3 illustrates the position of the clamp 40, transducer horn 32 and bonding tool 34 as a termination bond is made. After this termination bond is made, the control system of the wire bonder senses the cessation of the application of ultrasonic energy and sends a pulse to actuator 54 to close the jaws of clamp 40 on wire 70. At this moment, no wire is feeding out of the wire spool, so that wire 70 is static when the clamp 40 is closed. After the clamp 40 has closed on wire 70, actuator 58 is activated to move lever arm 36 to rotate clamp 40 so that its jaws move downward to form a bow 73 in wire 70, as illustrated in FIG. 4. The length of the arc of clamp 40 is controlled by adjustable set screw 59. With clamp 40 still closed and its jaws still in a downward position, the entire arm assembly 26 rises slightly through an upward rotation of pivot block 22 to which both are mounted, straightening the wire 70, breaking it at the point of bond and leaving a predetermined length of wire 74 exposed below bonding tool 34, as illustrated in FIG. 5. The length of wire 74 is controlled by the amount of bow 73 produced by the downward stroke of clamp 40. The bow 73 is eliminated as the transducer horn 32 and clamp 40 move upwards and the wire 70 is drawn through the tool. Wire 74 breaks at the back of the bond when the wire becomes taut. FIG. 6 illustrates the position of transducer horn 32, bonding tip 34, clamp 40, and flame-off tip 60 just after flame-off as a new ball 76 is beginning to form at the tip of exposed length of wire 74. At this position the clamp 40 is still closed. FIG. 6 also illustrates the subsequent release and rise of clamp 40 as its jaws rotate upward and the wire feed system pulls length of wire 74 through bonding tool 34 and new ball 76 up to its tip, as illustrated in the starting position of FIG. 1. After the clamp 40 is restored to its starting position, the entire system is in position to commence another bonding cycle.

The system disclosed above provides a positive control for insuring a constant, uniform length of wire 74 to be exposed below bonding tool 34 independent of the work height of any individual bond. With a constant length 74 exposed and the flame-off tip 60 set at a constant distance below bonding tip 34, the new ball 76 formed at flame-off will be constant in size and all initial ball bonds will be of uniform size and have uniform electrical characteristics.

As illustrated for reference purposes only in FIGS. 8 and 9, a mechanical wiper system may be substituted by the operator for the flame-off system to form hooks rather than balls after the terminal bond. FIG. 8 illustrates a front-to-back wiper and FIG. 9 illustrates a side-to-side wiper system. Wipers 86 and 88 bend length of wire 74 into a wedge-shaped hook. In the wiper configuration, the bonder will make wedge bonds of uniform size and electrical characteristics because of the controlled size of the bow 73 described above. In all cases, the control of the size of the ball or wedge is independent of operator proficiency in the use of the bonder.

The balance of the wire bonder is of conventional design well-known in the art. The wire feed system, in particular, includes conventional means for maintaining proper tension on the wire at all times and retracting wire in the event that an operator should move the bonding tip beyond a bonding point.

The capillary wire bonder described above functions with aluminum, gold, or other metallic wire and ribbon, permits the operator to control critical parameters of the bonding process and also have full visibility of work surface due to the radial alignment of the bonding tool. In addition, with a substitution of parts, a technician can quickly change the unit from an ultrasonic bonder to a thermocompression bonder.

The mechanism disclosed above for insuring a uniform length of wire below the bonding tip after a terminal bond a uniform-sized ball or wedge after flame-off or wipe off, regardless of the height of the work surface is far simpler in design and construction than any similar device disclosed in the prior art. Consequently, it is less expensive to manufacture and subject to far fewer service requirements. In addition, it has the unique virtue of functioning in a production environment as described above.

Having explained in detail the operation, features and advantages of a preferred embodiment structure, it should be understood that the operations are performed in a manner which permits exact and precise rapid movements of a wire bonding tool. The manner in which these operations are performed permits more rapid bonding with a higher degree of reliability than was heretofore obtained.

While there has been shown and described what is considered a preferred embodiment of the present invention, it will be obvious to those skilled in the art that various changes and modifications may be made therein without departing from the invention as defined in the appended claims.

We claim:

1. In apparatus adapted to form a tailless bond between fine electrical conductive wire and electrical contact points of semiconductor devices the combination of:

a. a mounting block;
b. a tool holder rigidly mounted on said block extending outward therefrom;
c. a capillary bonding tool on said tool holder, said bonding tool having a longitudinal axis, said bonding tool further having a capillary opening for receiving said conductive wire, said opening disposed coincident with said longitudinal axis of said tool;
d. a source of bonding energy for driving said bonding tool to form a bond between said conductive wire and said electrical contact point;
e. an assembly arm mounted on said block extending outward therefrom;
f. a lever arm pivotally mounted on said assembly arm;
g. a conductive wire clamp comprising a pair of jaws mounted on said lever arm, said jaws positioned and arranged to grasp said conductive wire at a selected distance from said bonding tool substantially along said bounding tool longitudinal axis;
h. means for actuating said clamp jaws to grasp said conductive wire;
i. means for moving said lever arm and said clamp a selected distance substantially along said axis toward said bonding tool by pivoting said lever arm and said clamp while said bonding tool remains stationary to form a bow in said conductive wire;
j. means for simultaneously raising said tool holder and said assembly arm away from said bond sufficient to break said conductive wire at said bond whereby a tailless bond is formed and whereby a predetermined length of conductive wire is left extending below said bonding tool substantially equal in length to said bow,
k. means for altering the end of said extending conductive wire to form an enlarged portion of a predetermined uniform size and shape in preparation for a future bonding sequence.

2. The apparatus of claim 1 further including adjustable means for varying the selected distance when said lever arm and said clamp are moved toward said bonding tool.

3. The apparatus of claim 2 wherein said means for altering said extending conductive wire comprises wipe off apparatus to form a wedge shaped hook of a predetermined size on the end of said conductor.

4. The apparatus of claim 2 wherein said means for altering said extending conductor comprises flame off apparatus to form a ball of a predetermined diameter on the end of said conductor.

* * * * *